US012706005B2

United States Patent

Herrnegger

(12) United States Patent
(10) Patent No.: US 12,706,005 B2
(45) Date of Patent: Aug. 11, 2026

(54) HOLDING DEVICE, IN PARTICULAR SHELF RAIL, FOR RECEIVING AN OBJECT

(71) Applicant: VusionGroup GmbH, Fernitz-Mellach (AT)

(72) Inventor: Philipp Herrnegger, Fernitz-Mellach (AT)

(73) Assignee: VusionGroup GmbH, Fernitz-Mellach (AT)

( * ) Notice: Subject to any disclaimer, the term of this patent is extended or adjusted under 35 U.S.C. 154(b) by 195 days.

(21) Appl. No.: 18/694,349

(22) PCT Filed: Sep. 29, 2021

(86) PCT No.: PCT/EP2021/076887
§ 371 (c)(1),
(2) Date: Mar. 21, 2024

(87) PCT Pub. No.: WO2023/051913
PCT Pub. Date: Apr. 6, 2023

(65) Prior Publication Data
US 2024/0395174 A1 Nov. 28, 2024

(51) Int. Cl.
*G09F 3/20* (2006.01)

(52) U.S. Cl.
CPC .............. *G09F 3/204* (2013.01); *G09F 3/208* (2013.01)

(58) Field of Classification Search
CPC ................................. G09F 3/204; G09F 3/208
See application file for complete search history.

(56) References Cited

U.S. PATENT DOCUMENTS

| | | | | | |
|---|---|---|---|---|---|
| 6,119,992 | A * | 9/2000 | Stuart | G09F 15/00 | 248/231.71 |
| 6,142,322 | A * | 11/2000 | Smith | A47F 5/0869 | 211/183 |
| 2004/0098897 | A1 * | 5/2004 | Thompson | G09F 3/204 | 40/661.03 |
| 2004/0178308 | A1 * | 9/2004 | Bacnik | G09F 3/204 | 248/223.41 |
| 2009/0019743 | A1 | 1/2009 | Nguyen | | |

FOREIGN PATENT DOCUMENTS

| | | | | |
|---|---|---|---|---|
| DE | 20 2021 100459 U1 | 2/2021 | | |
| ES | 1267820 U * | 5/2021 | | G09F 3/208 |

(Continued)

OTHER PUBLICATIONS

IT 2018-00010143 English Translation (Year: 2018).*
International Search Report issued in PCT/EP2021/076887; mailed Jun. 15, 2022.

*Primary Examiner* — Kyle R Grabowski
(74) *Attorney, Agent, or Firm* — Studebaker Brackett PLLC

(57) ABSTRACT

Holding device, in particular shelf rail, for holding an object provided for this purpose, in particular of a label, wherein the holding device comprises: a first holding element, preferably having a hook-shaped cross section, which is formed in a movable manner, a second holding element, preferably having a hook-shaped cross section, wherein the first holding element and the second holding element are formed to hold the object between them, a guide device, wherein the guide device is formed so that the first holding element can essentially be moved along a straight guide line.

20 Claims, 2 Drawing Sheets

(56) References Cited

FOREIGN PATENT DOCUMENTS

| | | | | | |
|---|---|---|---|---|---|
| IT | 2018 0001 0143 | A1 | | 5/2020 | |
| JP | 2001312221 | A | * | 11/2001 | ............. G09F 3/204 |
| WO | WO-2021032278 | A1 | * | 2/2021 | ............. G09F 3/208 |
| WO | WO-2023015405 | A1 | * | 2/2023 | ............. G09F 9/372 |

* cited by examiner

HOLDING DEVICE, IN PARTICULAR SHELF RAIL, FOR RECEIVING AN OBJECT

TECHNICAL FIELD

The invention relates to a holding device, in particular a shelf rail, for receiving an object, in particular a shelf label.

BACKGROUND

In supermarkets, shelf rails are used to be able to flexibly place, e.g., conventional or electronic price tags, generally labels, at the respective product.

Known shelf rails require special tools (see, e.g. FR2857143 with regard to this), in order to be able to exchange the price tags. In the case of shelf rails, which require special tools for exchanging the labels, the exchange takes longer, which is associated with a substantial use of time resources in the case of a large number of labels (sometimes several thousand pieces).

However, shelf rails also exist, which do not require special tools. The entire shelf rail has to be deformed in this case in order to insert or remove the label, respectively. In the case of such shelf rails, it can also happen that a shopping cart, which moves against the shelf rail, deforms the latter so that the label can release from the shelf rail.

It is thus the object of the invention to provide a holding device, in particular a shelf rail, in the case of which the mentioned problems are overcome.

SUMMARY OF THE INVENTION

This object is solved by means of a holding device according to claim 1. The subject matter of the invention is thus a holding device, in particular shelf rail, for holding an object provided for this purpose, in particular a label, wherein the holding device comprises a first holding element, preferably having a hook-shaped cross section, which is formed in a movable manner, a second holding element, preferably having a hook-shaped cross section, wherein the first holding element and the second holding element are formed to hold the object between them, and a guide device, wherein the guide device is formed so that the first holding element can essentially be moved along a straight guide line.

The measures according to the invention are associated with the advantage that a quick insertion and removal of the object into the holding device are possible without special tools. The movability of the first holding element thereby ensures that the object, which is inserted properly between the holding elements, is held reliably there by means of the holding elements and is released only by means of the movement of the first holding element, in order to then be capable of being removed from the holding device. To fasten the object into the holding device, the first holding element is initially moved analogously, the object is then positioned in the holding device or is inserted into the holding device, respectively, and the first holding element is moved back, so that the object is held reliably again by means of the two holding elements.

A highly stable holding device, e.g. also made of plastic, can furthermore be realized, in the case of which the majority of the holding device is formed to be as stiff as possible and as little deformable as possible. A holding device, which is as stable as possible, can thus be created, in the case of which there is no risk that it releases the object held by it in an unwanted manner due to unplanned force (such as, e.g., the collision with a shopping cart) and deformation resulting therefrom.

Further, particularly advantageous designs and further developments of the invention follow from the dependent claims as well as the following description.

The holding device can also be, for example, a coupling device, which is provided to temporarily hold objects, such as e.g., labels, on products, such as, e.g., pieces of clothing. As mentioned above, however, the holding device is preferably a shelf rail, which, as such, forms a front closure of a shelving, onto which products can be placed, or which is attached to a strip attached to the front edge of the shelving. Such a holding device can also be provided on a product presentation table.

The first holding element and the second holding element can comprise, for example, a hook-shaped cross section and/or can be formed as a hook, an eye or a groove or a plurality, respectively, or also combination of these elements. Both of the holding elements can be of an identical or different nature, can thus, for example, both be formed as hook, or one holding element as hook and the other one as eye or groove. If both holding elements are formed as hooks, these hooks can be formed to be directed towards one another or so as to face away from one another. The hook or the arm of the hook, respectively, can also extend in several directions, so that the hook can also be formed, for example, in a button-shaped manner.

The object to be held can be, for example, sensors for detecting states (e.g. temperature, moisture, movement, occupancy of a shelf, etc.) in a store or in a shelf. The object can also be a camera. However, the object is preferably labels for displaying product and/or price information. These labels can be analog or also electronic labels. Such electronic labels can be, for example, labels comprising an NFC chip, which are formed to send data to an external device, such as a mobile telephone, or to receive data from an external device, such as, e.g., a mobile telephone. Such an electronic label, however, can also comprise a screen, on which contents, such as the mentioned product and/or price information, are displayed. In the technical jargon, such electronic labels are referred to as electronic shelf labels (ESL). They typically comprise extremely energy-saving screens and can be operated with a battery.

The holding device has a longitudinal extension (length) and, depending on the position in the room, a width extension (width) or a height extension (height), respectively. Transversely to the plane, which is spanned by the longitudinal extension and the height extension, the holding device also has a depth extension (depth). Several objects, which are typically positioned along the longitudinal extension of the holding device, can preferably be mounted or held, respectively, on a holding device.

The cross section, in which the holding elements are defined in form, preferably refers to that sectional plane perpendicular to the longitudinal extension of the holding device. The first and second holding element thus particularly preferably comprise a hook-shaped cross section in a sectional plane perpendicular to the longitudinal extension of the holding device.

To be capable of being fastened to the holding device, the objects are also provided and formed to be held by the holding device and can comprise, for this purpose, a first counter holding element for cooperating with the first holding element, and a second counter holding element for cooperating with the second holding element. The object itself, however, can also be formed so that it is held on its outer region, for example on the housing of the object, by the first and the second holding element of the holding device. In this example, the housing or parts of the housing of the object itself, respectively, thus forms the first and second counter holding element. In the region of, e.g., its rear side or of its side walls, respectively, the housing can thus comprise depressions, strips or grooves, with which holding elements (e.g. formed in a hook-shaped manner in their cross section) can engage or engage behind these structures, respectively, in order to hold the object.

The guide device allows a movement of the first holding element along the guide line. This means that for the purposes of inserting and/or removing the object, the first holding element can be moved at least in a translatory manner across a region. As discussed, the guide device allows essentially a movement along a straight guide line. Essentially means thereby that other forms of movement are not ruled out completely but the main form of movement is at hand along the straight guide line. To remove the object, a removing movement (caused by a person) is performed, which effects that the first holding element is shifted parallel to the guide line away from the second holding element, so that the contact of the first holding element with the first counter holding element and/or the contact of the second holding element with the second counter holding element is releasable.

To insert the object, an insertion movement (caused by a person) is performed, which effects that the first holding element is shifted parallel to the guide line away from the second holding element. This shifting parallel to the guide line thereby first releases the space, which is required so that the holding elements and the counter holding elements can assume their desired position in order to insert the object into the holding device. In this inserted position, the first holding element can be moved back into its initial position, so that the first and the second holding element hold the first and second counter element, thus so that the holding device holds the object.

The dimensions or structures, respectively, of the object and of the holding device can be adapted to one another so that the object, due to its shape or dimension, respectively, automatically shifts the first holding element parallel to the guide line or along the guide line, respectively, during the insertion, thus no additional user interaction is necessary to move the first holding element.

As will be discussed below, several embodiments of the guide device exist, by means of which different guide lines can be realized.

According to a preferred embodiment, the guide device is formed so that the guide line runs essentially parallel to the connecting line between the first holding element and the second holding element.

This means that when the object is inserted, the first holding element can be shifted along the line from the contact point of the second holding element with the object towards the contact point of the first holding element with the object. In the case of planar contact points, there is a plurality of corresponding connecting lines in the case of a three-dimensional view, or the contact points span a connecting plane, respectively. The guide device can be formed so that the guide line runs parallel to a connecting line within this connecting plane. The guide device is preferably formed so that the guide line lies parallel to the shortest connecting line between the first holding element and the second holding element. The guide device is preferably formed so that the guide line lies parallel to that connecting line between the first holding element and the second holding element, which lies in the sectional plane perpendicular to the longitudinal extension of the holding device.

According to a further embodiment, the guide device is formed so that the guide line lies perpendicular to the shortest connecting line between the first holding element and the second holding element and perpendicular to the longitudinal extension of the holding device.

According to a further embodiment, the guide device is formed so that the guide line lies perpendicular to the shortest connecting line between the first holding element and the second holding element and parallel to the longitudinal extension of the holding device.

Further movements of the first holding element can also be admissible. The guide device can thus be formed, for example, so that, when no object is held, a movement of the first holding element into that region, in which the object is usually located, is possible. This is the case, for example, when the guide device has a wall, which limits the movement of the first holding element, whereby a movement of the first holding element away from the wall is not prevented, however.

It has turned out to be particularly advantageous, however, when the guide device is formed so that the first holding element can only be moved along the straight guide line. This means that with the exception of technically or structurally related tolerances, the first holding element can only be moved along the guide line. For the purposes of removing and inserting the object, the first holding element thus only performs a translatory movement. Due to this measure, it can be prevented as much as possible that the object can be removed from the holding device by means of strain types other than those of the removal movement, thus the motion sequence provided for the removal of the object and strains or force components associated therewith, respectively.

The guide device can be realized in different ways to guide the first holding element. The principle of a centering spider and/or of a loudspeaker beak, which is known from loudspeakers, can thus be used, for example, in order to realize the translatory straight guidance. For example, several such centering spiders and/or loudspeaker beads, which allow only an essentially translatory movement perpendicular to the planar expansion of the centering spider and/or of the loudspeaker bead, can be provided thereby for the implementation of the guide device.

It has turned out to be particularly advantageous, however, when the guide device comprises a first guide body, which can be moved along with the first holding element, and a second guide body, which is formed in an immovable manner relative to the second holding element, wherein the second guide body is formed to guide the first guide body parallel, in particular only parallel, to the straight guide line.

The first or second guide body can comprise, for example, pins or bolts, and the respective other guide body can comprise bores, so that the pins or bolts are guided in the bore or the bore is guided along the pins or bolts, respectively.

However, the first or second guide body can also comprise, for example, at least one spring, and the respective other guide body can comprise at least one groove, so that the spring is guided in the groove or the groove is guided along the spring, respectively, as it is known, for example, from the wood joining technology, wherein a non-positive connection between spring and groove has to obviously be present in the case at hand in order to provide for the relative movement of the two guide bodies.

As mentioned, the first or second guide body can also in each case comprise at least one wall, so that the at least one wall of the second guide body guides the at least one wall of the first guide body.

The second guide body is preferably a part of a groove, which is formed along the longitudinal extension of the holding device, into which groove the first guide body can dip during its movement. The depth of the groove is dimensioned so that the first holding element can reliably release the object to be held. Concretely, the groove walls are provided by means of the (in the present case plate-shaped) second guide body on the one hand and by means of a central web of the holding device, which is formed in a planar manner, on the other hand. If the object is inserted into the holding device, it abuts essentially in a planar manner against this central web or is positioned closely next to it. The width of the groove is thereby dimensioned so that the first guide body is movable in the groove with as little to no friction whatsoever. In this configuration, the second guide body de facto forms a front flat guide wall and the central web forms a rear flat guide wall for the first guide body, which can be moved therebetween. Viewed along the height extension, the groove is provided on an end region of the central web of the holding device, and the second holding element is provided on the other end region of the central web. In a preferred formation, the first guide body runs in a plate-shaped manner along the longitudinal extension of the holding device.

According to a further aspect of the invention, the holding device comprises a central web, which connects the first holding element to the second holding element. The second holding element is preferably immovably connected to the central web. In contrast, the first holding element is movably connected to the central web. The central web can also be formed accordingly stable, such as, e.g., accordingly thick, in order to ensure a highest possible stability or stiffness, respectively, and to thus counteract forces, which could effect a rotation or bending of the holding device. The movability of the first holding element is ensured by means of a further structural measure, which will be discussed in detail below.

Fastening tabs, which are connected to the central web on the upper edge and on the lower edge and which centrally (with respect to the central web) comprise a cutout, can be provided on the rear side of the central web. They serve the purpose of encompassing a fastening strip (e.g. on the front edge of a shelving) from two sides (thus from the top and from the bottom) and to thus fasten the holding device to the fastening strip. Due to the central cutout, the holding device can be pushed onto the fastening strip from the side, so that the central web abuts against the one flat side of the strip, while the tabs grip or touch, respectively, the other (flat) side. The fastening tabs are thus formed to establish a contact with a carrying device, in particular a shelf, so that the holding device can be mounted to the carrying device. This allows for a precise positioning of the holding device on the carrying device. For example, a shelf rail can thus be mounted to the shelf at a defined angle, so that labels held therein can be read particularly easily.

According to a preferred embodiment, the holding device comprises a spring element, which is formed to hold the first holding element in position and/or which is formed to push the first holding element against the object, which is inserted into the holding device as intended.

The spring element can be formed to hold the first holding element at a certain position. In the position, in which it holds the object, the spring element is thereby essentially relaxed, thus except for, for example, a strain caused by the weight of the object. The spring element can furthermore be dimensioned in such a way that the held object is held in the holding device in its target position but is not clamped additionally.

However, the spring element can also be formed to direct the spring force at the object when the object is inserted or held, respectively. The spring element can thus be formed to push the first holding element against the object. The holding device is formed in this case to hold and to clamp the object.

Together with the spring element, the first holding element can thus form a snap closure, in the case of which the first holding element can be moved towards and away from the object to be held only in one plane.

It has turned out to be particularly advantageous when at least a portion of the spring element, preferably the entire spring element, is connected to at least a portion of the guide device, preferably to the entire guide device, preferably formed in one piece. This means that, together, the spring element and the guide device are made as a unit and/or, together, of a single material (portion), e.g. of plastic in an injection molding process. This allows for a cost-efficient and economic production of the holding device. Time- and optionally personnel-intensive assembling during the production can thus be reduced or are dispensable at all.

If such a holding device, in the case of which at least a portion of the spring element and at least a portion of the guide device are made of one material, comprises a guide device, which, as discussed, comprises at least the first guide body and the second guide body, it has turned out to be particularly advantageous when the first guide body is connected to the spring element, preferably formed in one piece. This means that, as mentioned, the first guide body, together with the spring element, can be made of plastic, e.g., in an injection molding process. The guide device as well as the spring element can thus be manufactured or realized jointly, respectively, in a very small installation space and in particular in a single operating step.

If individual parts are to be used, however, the spring element can be formed e.g., as torsion spring or also as helical spring. The spring element can also comprise a torsion arc, which stores the spring energy in response to torsion.

It has turned out to be particularly advantageous, however, when the spring element is at least partially formed as flexible spring. Flexible spring is to be understood hereby that the spring element is essentially formed to be subjected to bending strain and to thereby absorb the tension energy, in order to release the latter again later. Due to the use of a flexible spring or due to the formation of the spring element as flexible spring, an economical production or manufacture, respectively, of the holding device is possible, in particular in the above-mentioned one-piece construction.

It has turned out to be particularly advantageous in this context when the spring element comprises at least one bending arc. The arc is preferably formed with a rounding, thus has a radius, for example, in the apex. The two legs of the bending arc thus transition into a curved shape, in particular into a circle-like or a circle segment-like shape in this case. In this case, the spring element is characterized in that the angle between the legs or the angle between sections of the two legs of the bending arc, respectively, change in response to the movement of the first holding element.

It should furthermore be mentioned that a structure can be provided, which runs in a pointed or wedge-shaped manner, respectively, can also be provided in an equally effective manner instead of the bending arc. It is important to note thereby, however, that, compared to the bending arc, strain peaks, which are expected in a punctiform or local manner, respectively, compared to the bending arc, are compensated or absorbed, respectively, by means of a suitable material selection or the material thickness. Such a structure can thus comprise two legs, which transition into one another in the angle apex or are connected to one another in the angle apex.

The energy absorbed in the spring element can be distributed particularly well to the deformable material by means of the use of a bending arc, at least when moving the first holding element, whereby high local tensions in the spring element are avoided. This measure thus contributes decisively to the durability of the spring element and in particular in the one-piece construction thus also to the durability of the entire holding device. The spring deflection as well as the spring stiffness can furthermore be predefined precisely.

In the case of such a holding device comprising bending arc, it has turned out to be particularly advantageous when the at least one bending arc of the spring element extends between the central web and the first holding element. The bending arc preferably engages essentially directly with the central web. It is advantageous for this purpose when the central web is rigidly connected to the second holding element on one end or end region, respectively, and the bending arc engages essentially directly with the other end or end region, respectively, of the central web. Particularly preferably, the bending arc is attached on that side of the central web, which faces away from the object to be carried. The bending arc is thus de facto hidden on the rear side of the holding device. This allows for a very compact construction, which leaves a lot of space for receiving the object on the front side of the holding device. The spring element can thus be formed so that it provides a sufficient spring deflection, without thereby impacting the optical appearance of the holding device, which is usually viewed from the front side. A spring element attached in this way also ensures that the movement of the portions of the spring element is limited to the regions below or behind the held object, respectively, so that the held object is uninfluenced thereby.

That end of the central web, with which the bending arc engages, is preferably the lower end of the central web, thus that end, which is located below the other end in the case of the use of the holding device according to the invention. The spring element can thus be pushed farther out of the field of view of an observer of the object.

The holding device thus preferably comprises a spring element, which is connected to the first holding element and a portion of the guide device, in particular to the first guide body or which is made of one material, together with the first holding element and/or a portion of the guide device, respectively. The holding device can be formed, for example, so that the first guide body of the guide device can be moved along the second guide body of the second guide device, can thus glide along it, for example. An object support structure can also be provided here, which additionally holds the object, which is inserted as intended, in the desired position. This object support structure can be connected to the first guide body and the first holding element on the one side and to the spring element on the other side. However, the first guide body can also transition directly into the spring element. The first guide body thus transitions into the first holding element and—directly or indirectly—into the spring element. In the further course of the structure, the spring element now preferably has the bending arc, which increases the spring deflection and which is particularly preferably directed away from the object, which is held as intended. The spring element now ends in a rear side or on an underside of the central web, of the holding device, which is preferably made of the same material as the spring element, so that the spring element, together with the central web, is a single piece. The other structural elements of the holding device, in particular the central web, are significantly stiffer with regard to the usual strain of the respective components when using the holding device as the spring element as intended, so that deformations appear mainly or even exclusively at the spring element when inserting and/or removing an object. The second guide body of the guide device, which guides the first guide body or which prevents, respectively, that the first guide body and thus the first holding element moves away from the central web, can be provided on the central web. For this purpose, the first guide body and the second guide body can each comprise the wall, which forms the free end of a hook-shaped cross section, whereby the walls of the two guide bodies can be moved past one another or can glide along one another. The other side of the wall of the first guide body can be formed here so that the wall of the first guide body can be moved past the central web in places or the central web limits a movement of the first holding device in the direction towards the central web, respectively, so that the central web represents or forms, respectively, a portion of the guide device at this point and realizes a third guide body. The central web can transition into the fastening tabs or can form the fastening tab itself. In the further structural course, the central web transitions into the second holding element.

In the case of this preferred embodiment, the second holding element is therefore connected to the central web and is formed in a sufficiently stable manner to avoid a deformation of the second holding element when inserting or removing the object.

The central web is likewise formed in a very stable or stiff manner, respectively, so that no significant deformation appears during the insertion and removal. On the side of the central web facing away from the second holding element, the central web forms the plate-like third guide body and transitions into the second guide body, which faces the object, on the one hand, and into the first leg of the bending arc of the spring element, which faces away from the object, on the other hand.

The bending arc is thus formed to be more flexible than the guide bodies and the central web. In the case of manufacture of one material by means of injection molding process, this can be implemented particularly well, in that the wall thickness of the bending arc or the legs thereof, respectively, is designed to be narrower or thinner, respectively, than the wall thickness of the central web.

From a mechanical aspect, the first leg can thus be considered to be a cantilever element, which is firmly clamped in the central web, which, when viewed in an idealized manner, is not deformable. It goes without saying that in practice, the central web can also be deformed in response to sufficient strain, but is it characterized in that the deformation in the central web is very low compared to the deformation in the spring element.

In a particularly preferred embodiment, the first leg of the bending arc transitions into the—in the present case—semicircular portion of the bending arc. The apex of the bending arc faces away from the object, which is inserted as intended. This makes it possible to hold an object by means of the holding device, which covers or protrudes beyond, respectively, the guide device and the spring element in some places or completely. For example, a label can thus be held, which is higher than the corresponding height of the holding device That portion of the bending arc, which is semi-circular in the present case, transitions into the second leg. On the other end of the second leg, the second leg transitions into the object support structure. The second leg is more elastic than the object support structure, so that a translatory movement of the object support structure is made possible, without the object of the support structure deforming, wherein the translatory movement is met with a corresponding spring force by means of the spring element.

The object support structure is likewise plate-shaped and transitions into the first holding element and the first guide body via a first connecting web. The first holding element is thereby formed or placed, respectively, so that there is sufficient space between the central web and the first holding element in order to receive the object provided for this purpose. The first guide body is thereby formed or placed, respectively, in such a way that the first guide body can be moved between the second and the third guide body and is guided away from it.

The second guide body is formed to be capable of being positioned at a distance from the central web and in a plate-shaped manner and extends parallel to the front wall of the central web. Together with the third guide body and the second guide body, a second connecting web, which attaches to the lower end of the central web and the dimension of which defines the distance between the central web and the second guide body, forms a shaft-shaped or groove-shaped guide structure, respectively, which forms a portion of the guide device and which provides for a gliding of the first guide body only in one plane within the guide structure. Due to the fact that the first guide body is also formed in a plate-shaped manner and is connected to the first holding element, this has the result that, in a cross-sectional view of the holding device, the first holding element can be moved away from the second holding element or towards the second holding element, respectively, only along the mentioned straight line. The elasticity of the movable elements (thus in particular of the first holding element and its connection to the spring element as well as the spring element itself) is additionally designed in such a way by means of the selection of the material or wall thickness, respectively, and/or the material selection that the deformation during the movement of the first holding element is limited to a relatively narrow region in the surrounding area of the first holding element along the longitudinal extension, so that adjacent objects held by the holding device can optionally not unintentionally fall out of the holding device, are thus still held. This means that the deformation of the deformable portions of the holding device subsides relatively quickly in the surrounding area of the moved object, which is the cause of the deformation of the deformable portions of the holding device, so as not to impact the holding of adjacent objects on the holding device.

Instead of the spring element or in addition to the spring element, the holding device can comprise at least one locking element, with which the movement of the first holding element can be locked. Such a locking element can be realized, for example, by means of a wing screw and corresponding bores in the components of the guide device and/or in the first holding element. It goes without saying that, alternatively, a worm screw etc., are used as well. The locking element can also be realized, for example, with a bolt and a spring, so that, for locking purposes, the spring pushes the bolt into corresponding bores of the components of the guide device and/or of the first holding element. The locking element makes it possible to prevent the removal of the object. If the locking element is used instead of the spring element, it can be used to fix the object on its position after the insertion, so that the object is held securely by the holding device. If the locking element is used in addition to the spring element, it can be used to intensify or to secure, respectively, the hold of the object in the holding device, so that the object is prevented from falling out of the holding device even in response to more rigorous strain (e.g. unintentionally acting directly on the object).

Independently of the topic of the locking element, the first and the second holding element can be formed as short holding elements, which are provided to essentially hold the object in a punctiform manner. The first holding element can thus be formed, for example, from two narrow hooks, which are provided to grip and to hold the object on two points.

However, the first holding element preferably extends essentially over the entire length or longitudinal extension of the holding device, respectively.

The second holding element preferably also extends essentially over the entire length or longitudinal extension of the holding device, respectively.

These measures allow for a simple production of the holding device as well as for a flexible positioning of the objects at any position of the holding device. Highly stable holding elements can thus furthermore also be realized.

The first holding element and/or the second holding element are thereby particularly preferably formed in a rail-like manner. A rail-like formation means that the cross section of the corresponding component is essentially constant along the longitudinal extension of the holding device.

However, only one of the holding elements can extend essentially over the entire length of the holding device, while the other holding element extends only over a portion of the length of the holding device or is realized several times at different locations along the longitudinal extension.

As discussed, the guide device can be realized in different ways.

It is also advantageous here when the guide device extends essentially over the entire length or longitudinal extension of the holding device, respectively.

This measure also allows for a simple and thus cost-efficient production of the holding device. A wedging when guiding the first holding element is furthermore avoided with this embodiment because only one component has to be moved.

The guide device is preferably also formed in a rail-like manner in this case.

In the case of the spring element, it is also advantageous when the spring element extends essentially over the entire length or longitudinal extension of the holding device, respectively.

This measure also contributes to a simple and cost-efficient production. The local tension peaks in the spring element can thus furthermore be reduced because a larger material volume for providing the spring effect is available.

In the case of the spring element, it is also advantageous when the latter is formed in a rail-like manner.

It has furthermore turned out to be advantageous when the holding device comprises a protective lip, which is formed so that the protective lip touches the object when the object is held. Due to the geometry of the remaining holding device, the protective lip can thus be formed so that it touches the object exactly or pushes slightly against the object, respectively. It can thus be prevented that contaminations, such as dust and/or liquids can penetrate in the region covered by the protective lip, thus in particular between object and holding device.

The first holding element and/or the second holding element can each comprise a chamfer or rounding, which is formed so that the first holding element is moved along the guide line in response to a mechanical strain on this chamfer or rounding. When inserting the object, the first holding element is thus automatically moved away from its original position, so that the object can be brought into the provided position (by a person). This measure provides for a quick insertion of the object.

It is important to mention that the second holding element can likewise be formed in a movable manner. The teaching disclosed here with regard to the first holding element can be transferred or applied, respectively, to the second holding element in this case. A second guide device for guiding the second holding element along a further guide line or along the same guide line, along which the first holding element is guided, can thus be provided. A second spring element and/or a second locking element can also be provided.

These and further aspects of the invention follow from the figures discussed below.

BRIEF DESCRIPTION OF THE FIGURES

The invention will be described once again in more detail below with reference to the enclosed figures on the basis of exemplary embodiments, to which the invention is not limited, however. Identical components in the various figures are thereby provided with identical reference numerals. Schematically.

DESCRIPTION OF THE EXEMPLARY EMBODIMENTS

Figure 1:
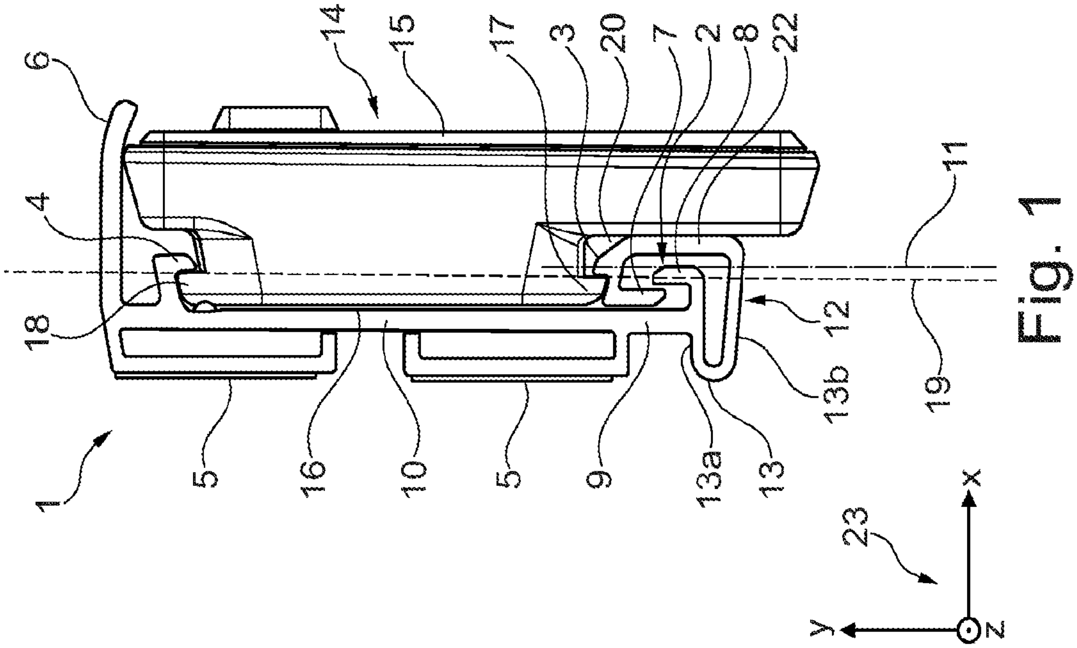
FIG. 1 shows a holding device comprising spring element.

FIG. 1 shows a holding device, which is formed as shelf rail 1. The shelf rail 1 comprises a guide device 2 as well as a first holding element 3 with hook-shaped cross section, which first holding element 3 extends over the entire length of the shelf rail 1, and a second holding element 4 with hook-shaped cross section, which second holding element 4 extends over the entire length of the shelf rail 1. The shelf rail 1 furthermore comprises two fastening tabs 5, a central web 10, an object support structure 22 and a protective lip 6.

In the left lower region of FIG. 1 (as well as in the case of the other figures), a right-handed cartesian coordinate system 23 is illustrated. The longitudinal extension of the shelf rail 1 thereby runs along the z direction, which protrudes from the drawing plane. The width extension of the shelf rail 1, which can also be understood here as height extension of the shelf rail 1, runs in the y direction here, which points from the bottom to the top in the illustration. The depth extension of the shelf rail 1 runs in the x direction, thus from left to right in the illustration. In the sectional plane, the cross section of the shelf rail 1 is illustrated perpendicular to the longitudinal extension, thus perpendicular to the z direction. The sectional plane thus lies in the or parallel to the x-y plane.

In FIG. 1, the guide device 2 of the shelf rail 1 comprises a first guide body 7, which is connected to the first holding element 3, and a second guide body 8, which is immovable relative to the second holding element 4. The first guide body 7 and the second guide body 8 are formed in a plate-shaped manner and cooperate in such a way that the second guide body 8 guides the first guide body 7 in such a way that a movement of the first guide body 7 or of the first holding element 3, respectively, away from the central web 10 is prevented. In this exemplary embodiment, the guide device 2 furthermore comprises a third guide body 9, which is formed by a portion of the plate-shaped central web 10 and thus forms a (lower) portion of the central web 10. The third guide body 9 prevents a movement of the first guide body 7 and thus a movement of the first holding element 3 towards the central web 10.

In this exemplary embodiment, the first holding element 3 can only be moved in one plane, which plane runs parallel to the front wall of the central web 10, due to the first guide body 7, which can only be moved between the second guide body 8 and the third guide body 9. In the illustrated cross section, the plane is suggested by the guide line 11, which simultaneously also displays the direction, along which the first holding element 3 can move. This guidance of the first holding element 3 takes place under framework conditions, which are determined by the formation of the remaining components, as it will be discussed in the following.

The first holding element 3 connects to the first guide body 7, from where the object support structure 22 extends, which leads into a spring element 12, which comprises a bending arc 13, which increases the spring length and which connects to the third guide body 9, which forms the lower end of the central web 10. The bending arc 13 curves, starting at the rear side of the lower end of the central web 10, at an angle of approx. 180° towards the object support structure 22. The first leg 13*a* of the bending arc 13 connects to the rear side of the central web 10, and the second leg 13*b* of the bending arc 13 connects to the object support structure 22. The spring element 12 holds the first holding element 3 in position and counteracts a movement of the first holding element 3 away from the second holding element 4, whereby this movement is necessary to release the object, which is an electronic label 14 in the present case, and to be able to remove it subsequently.

The spring element 12 extends over the entire longitudinal extension of the shelf rail 1 and is formed in a rail-like manner. During the deflection of the first holding element 3 from the rest position, the desired spring effect is created in the spring element 12, which counteracts the movement of the first holding element 3.

With the guide bodies 7, 8 and 9, the guide device 2 prevents that the first holding element 3 moves in the direction towards the central web 10 or moves away from the central web 10.

The guide device 2 thus ensures here that only a movement of the first holding element 3 along the straight guide line 11 is possible. From a kinematic aspect, each material point of the first holding element 3 (except for technically-related tolerances) can only be moved in a translatory manner along a straight path, whereby this path runs parallel to the guide line 11. The guide line 11 can thus be interpreted as one of these paths of any representative material point of the first holding element 3, whereby the straight course of this path is determined by the formation of the guide device 2 under the framework conditions specified by the spring element 12.

A chamfer 20, which simplifies the insertion of the label 14 into the shelf rail 1, is located in the transition of the first guide body 7 into the first holding element 3.

The label 14 comprises a front side 15 and a rear side 16. In the held state, the rear side 16 of the label 14 faces the front side of the central web 10 of the shelf rail 1. The label 14 thus abuts against the front side of the central web 10 or is positioned at least adjacent thereto. A screen, which displays product and price information for a product, is located on the front side 15 of the label 14.

The label 14 comprises a first counter holding element 17 with hook-shaped cross section and a second counter holding element 18 with hook-shaped cross section. The counter holding elements 17 and 18 are located on the rear side 16 of the label 14 or are formed from the extension of the rear side 16, respectively. The label 14 is held by the shelf rail 1 in that the first holding element 3 holds or surrounds, respectively, or grips, respectively, the first counter holding element 17, and the second holding element 4 holds or surrounds, respectively, or grips, respectively, the second counter holding element 18 so that a shifting of the label 14 away from the central web 10, in the perpendicular direction based on the central web 10 (thus in the x direction) is prevented in this state.

Figure 2:
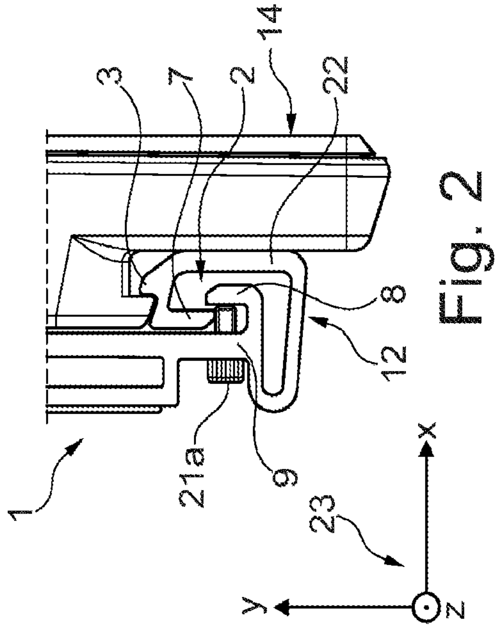
FIG. 2 shows a portion of a holding device comprising spring element and locking element.

FIG. 2 shows a section of a further exemplary embodiment of the shelf rail 1, which comprises a guide device 2 and a spring element 12. In this exemplary embodiment, the shelf rail 1 furthermore comprises a locking element, whereby the locking element is formed as knurled-head screw 21*a*, which is screwed through a bore provided with a thread in the third guide body 9 or in the central web 10, respectively. The knurled-head screw 21*a* prevents a movement of the first guide body 7 and of the first holding element 3 away from the label 14. To remove the label 14, the trained personnel can simply unscrew the knurled-head screw 21*a* by hand and, as a result, can move the first guide body 7 and thus also the first holding element 3.

Figure 3:
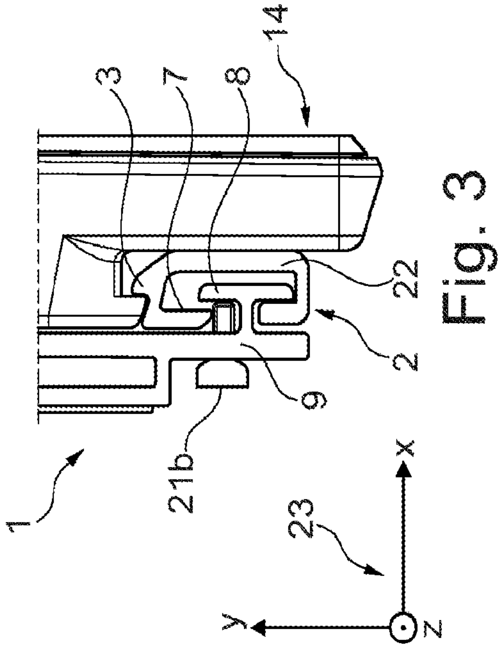
FIG. 3 shows a portion of a holding device comprising locking element.

A further exemplary embodiment comprising the locking element is shown in FIG. 3. In contrast to FIG. 2, the shelf rail 1 in FIG. 3 does not comprise a spring element 12. Instead of the knurled-head screw 21*a*, a wing screw 21*b* is used in FIG. 3.

Figure 5:
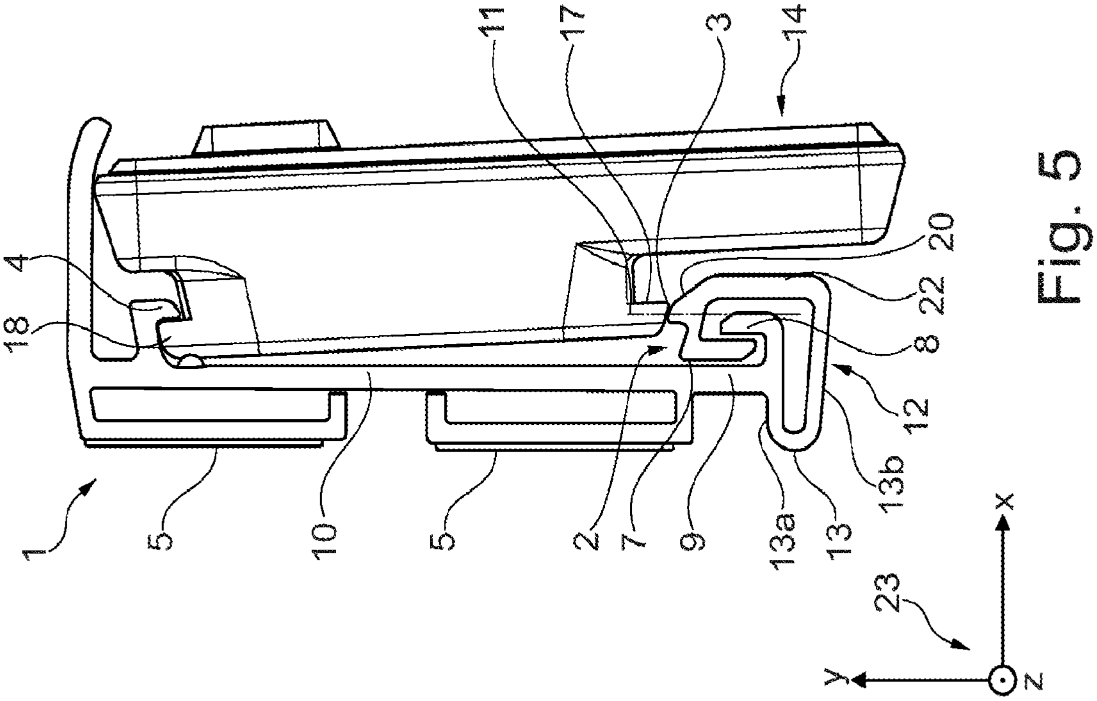
FIG. 4-5 show an object, which is partially inserted into or removed from, respectively, the holding device according to FIG. 1
Figure 4:
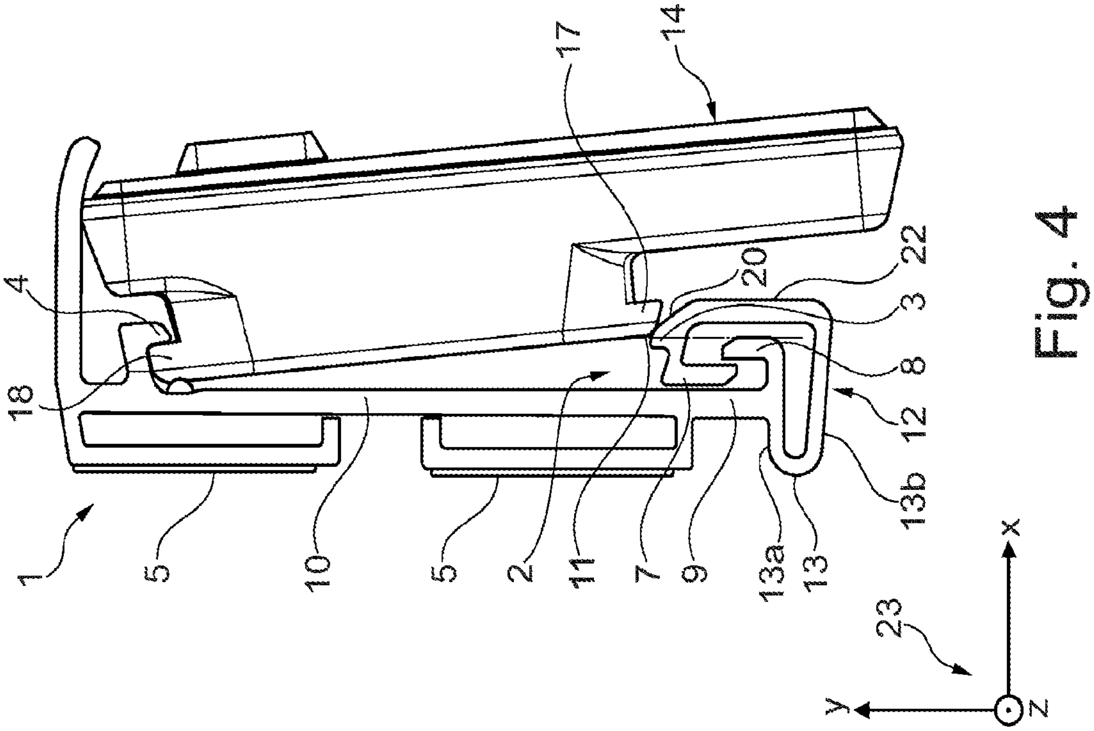

FIGS. 4 and 5 shows the insertion movement of the label 14 into the shelf rail 1 shown in FIG. 1. In FIG. 4, the second counter holding element 18 was already positioned in the groove, which is encased by the second holding element 4. The first counter holding element 17 is still located in front of the first holding element 3 or in front of the chamfer 20, respectively. If the label 14 and in particular the first counter holding element 17 thereof is now moved in the direction of the central web 10 (thus opposite to the x direction), the first counter holding element 17 pushes against the chamfer 20, and the first holding element 3 and the first guide body 7 is moved away from the second holding element 4, and the first guide body 7 dips into the groove between the second the third guide body 8 and 9. The first holding element 3 thus moves away from the second holding element 4 only along the straight guide line 11.

As shown in FIG. 5, the bending arc 13 of the spring element 12 opens thereby and the spring element 12 is tensioned. The spring element 12 thus pushes the first holding element 3 along the guide line 11 towards the second holding element 4.

As soon as the first counter holding element 17 is moved over the first holding element 3, the first holding element 3 thus snaps in the direction of the second holding element 4 as a result of the spring force caused by the spring element 12, so that the first holding element 3 and the second holding element 4 hold the label 14 securely again, as it is shown in FIG. 1 and described in this context. Together with the spring element 12, the first holding element 3 thus forms a snap closure, in the case of which the first holding element 3 can only move towards and away from the label 14 to be held only in one plane.

To remove the label 14 from the shelf rail 1, the removal movement has to be run through, which includes shifting the label 14 away from the second holding element 4, thus towards the first holding element 3, until the second counter holding element 18 can be tilted past the second holding element 4. The label 14 can subsequently be removed from the first holding element 3 obliquely towards the top.

To remove the label 14 from the shelf rail 1, one can also push onto the first holding element 3 from the top, adjacent to the label 14, so that the above-discussed movement of the first holding element 3 takes place.

In the case of the exemplary embodiments with locking device 21*a*, 21*b*, the latter has to be unlocked prior to the removal or has to be locked after the insertion, respectively.

In the case of the exemplary embodiment without spring element 12, the guide device 2 can be formed so that the first holding element 3 moves in the direction of the second holding element 4 as a result of the gravity, or these movements can be performed manually and the positions can be held by hand, until the position is fixed by means of locking device 21*a*, 21*b*.

Lastly, it is also pointed out once again that the figures, which are described above in detail, are only exemplary embodiments, which the person of skill in the art can modify in a large variety of ways, without leaving the scope of the invention. For the sake of completeness, it is also pointed out that the use of the indefinite article "a" does not rule out that the respective features can also be present more than once.

The invention claimed is:

1. A holding device, for holding an object wherein the object is a label, wherein the holding device is a shelf rail that comprises:

a first holding element comprising a hook-shaped cross section, which is formed in a movable manner, a second holding element comprising a hook-shaped cross section, wherein the first holding element and the second holding element are formed to hold the object between them, a guide device extending along the shelf rail and having a shape in cross section that connects with the hook-shaped cross section of the first holding element so that the first holding element can essentially be moved along a straight guide line, wherein the holding device comprises a spring element, which is formed to hold the first holding element in position and/or which is formed to push the first holding element against the object, which is inserted into the holding device as intended, and wherein the spring element is at least partially formed as a bending spring.

2. The holding device according to claim 1, wherein the guide device is formed so that the guide line runs essentially parallel to a connecting line connecting the first holding element and the second holding element.

3. The holding device according to claim 1, wherein the guide device is formed so that the first holding element can be moved only along the straight guide line.

4. The holding device according to claim 1, wherein the guide device comprises, a first guide body, which can be moved along with the first holding element, and a second guide body, which is formed in an immovable manner relative to the second holding element, wherein the second guide body is formed to guide the first guide body parallel to the straight guide line.

5. The holding device according to claim 1, wherein the holding device comprises a central web, which connects the first holding element to the second holding element.

6. The holding device according to claim 1, wherein at least a portion of the spring element is connected to at least a portion of the guide device.

7. The holding device according to claim 6, wherein the guide device comprises, a first guide body, which can be moved along with the first holding element, and a second guide body, which is formed in an immovable manner relative to the second holding element, wherein the second guide body is formed to guide the first guide body parallel to the straight guide line, and the first guide body is connected to the spring element.

8. The holding device according to claim 6, wherein the guide device comprises, a first guide body, which can be moved along with the first holding element, and a second guide body, which is formed in an immovable manner relative to the second holding element, wherein the second guide body is formed to guide the first guide body only parallel to the straight guide line, and the first guide body is connected to the spring element.

9. The holding device according to claim 6, wherein the guide device comprises, a first guide body, which can be moved along with the first holding element, and a second guide body, which is formed in an immovable manner relative to the second holding element, wherein the second guide body is formed to guide the first guide body parallel to the straight guide line, and the first guide body and the spring element are formed in one piece.

10. The holding device according to claim 6, wherein the guide device comprises, a first guide body, which can be moved along with the first holding element, and a second guide body, which is formed in an immovable manner relative to the second holding element, wherein the second guide body is formed to guide the first guide body only parallel to the straight guide line, and the first guide body and the spring element are formed in one piece.

11. The holding device according to claim 1, wherein the spring element comprises at least one bending arc.

12. The holding device according to claim 11, wherein the holding device comprises a central web, which connects the first holding element to the second holding element, and the at least one bending arc of the spring element extends between the central web and the first holding element.

13. The holding device according to claim 1, which comprises at least one locking element, with which the movement of the first holding element can be locked.

14. The holding device according to claim 1, wherein the first holding element and/or the second holding element extend essentially over the entire longitudinal extension of the holding device.

15. The holding device according to claim 1, wherein the guide device extends essentially over the entire longitudinal extension of the holding device.

16. The holding device according to claim 1, wherein the guide device comprises, a first guide body, which can be moved along with the first holding element, and a second guide body, which is formed in an immovable manner relative to the second holding element, wherein the second guide body is formed to guide the first guide body only parallel to the straight guide line.

17. The holding device according to claim 1, wherein an entirety of the spring element is connected to at least a portion of the guide device, or wherein at least a portion of the spring element is connected to an entirety of the guide device.

18. The holding device according to claim 1, wherein an entirety of the spring element is connected to an entirety of the guide device.

19. The holding device according to claim 1, wherein the spring element and the guide device are formed in one piece.

20. A holding device, for holding an object wherein the object is a label, wherein the holding device is a shelf rail that comprises:

a first holding element comprising a hook-shaped cross section, which is formed in a movable manner, a second holding element comprising a hook-shaped cross section, wherein the first holding element and the second holding element are formed to hold the object between them, a guide device extending along the shelf rail and having a shape in cross section that connects with the hook-shaped cross section of the first holding element so that the first holding element can essentially be moved along a straight guide line, wherein the holding device comprises a spring element, which is formed to hold the first holding element in position and/or which is formed to push the first holding element against the object, which is inserted into the holding device as intended, and wherein the spring element extends essentially over the entire longitudinal extension of the holding device.

* * * * *